United States Patent
Maheshwara et al.

(10) Patent No.: US 9,131,275 B2
(45) Date of Patent: Sep. 8, 2015

(54) MANAGING VIDEO-ON-DEMAND IN A HIERARCHICAL NETWORK

(71) Applicant: Infosys Limited, Bangalore (IN)

(72) Inventors: Mahendra Maheshwara, Bangalore (IN); Mandeep Singh Sandhu, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/085,567

(22) Filed: Nov. 20, 2013

(65) Prior Publication Data

US 2014/0150039 A1    May 29, 2014

(30) Foreign Application Priority Data

Nov. 23, 2012  (IN) ............... 4888/CHE/2012

(51) Int. Cl.

| | |
|---|---|
| H04N 7/16 | (2011.01) |
| H04N 7/173 | (2011.01) |
| G06F 15/16 | (2006.01) |
| H04N 21/482 | (2011.01) |
| H04N 21/472 | (2011.01) |
| H04N 21/466 | (2011.01) |
| H04N 21/258 | (2011.01) |
| H04N 21/475 | (2011.01) |
| H04N 21/231 | (2011.01) |
| H04N 21/63 | (2011.01) |
| G06F 15/173 | (2006.01) |

(52) U.S. Cl.
CPC ..... *H04N 21/4826* (2013.01); *H04N 21/23113* (2013.01); *H04N 21/23116* (2013.01); *H04N 21/25891* (2013.01); *H04N 21/466* (2013.01); *H04N 21/4668* (2013.01); *H04N 21/4756* (2013.01); *H04N 21/47202* (2013.01); *H04N 21/632* (2013.01)

(58) Field of Classification Search
CPC ............... H04N 21/4668; H04N 21/25891; H04N 21/4756; H04N 21/466; H04N 21/4826; H04N 21/4532; H04N 21/4667; H04N 21/4331; H04N 21/47202; H04N 21/2181; H04N 21/4334; H04N 21/44204; H04N 21/632; H04N 21/23113; G06Q 30/0282; H04L 29/08729; H04L 67/10; G11B 27/36; H04H 60/21; H04H 60/23; H04H 60/82
USPC ............... 725/87, 92, 98, 115, 118, 119, 120, 725/134, 142; 709/218, 224, 226, 232, 235
See application file for complete search history.

(56) References Cited

U.S. PATENT DOCUMENTS

| | | | |
|---|---|---|---|
| 8,169,916 B1 * | 5/2012 | Pai et al. ......... | 370/238 |
| 2006/0218301 A1 * | 9/2006 | O'Toole et al. ........ | 709/244 |

(Continued)

*Primary Examiner* — Hoang-Vu A Nguyen-Ba
(74) *Attorney, Agent, or Firm* — Klarquist Sparkman, LLP

(57) ABSTRACT

Technologies manage video-on-demand (VoD) for a set of video files stored in a hierarchical network comprising a plurality of nodes, one or more of the plurality of nodes being user nodes, the user nodes connected to one or more of the plurality of parent nodes, and one or more of the plurality of parent nodes storing a video file previously requested by a user node, the method comprising, for a user node, periodically ranking a video file from the set of video files wherein the ranking is based on separation between a parent node in the network storing the video file and the user node, and interest of the user node for the video file; and on receiving a request for the VoD, providing a list of the set of video files and recommending one or more video files having a predefined ranking.

28 Claims, 4 Drawing Sheets

(56) References Cited

U.S. PATENT DOCUMENTS

| | | | |
|---|---|---|---|
| 2009/0006368 A1* | 1/2009 | Mei et al. | 707/5 |
| 2009/0316715 A1* | 12/2009 | Saniee | 370/429 |
| 2012/0204201 A1* | 8/2012 | Cassidy et al. | 725/10 |
| 2014/0164308 A1* | 6/2014 | Verhoeyen et al. | 706/46 |

* cited by examiner

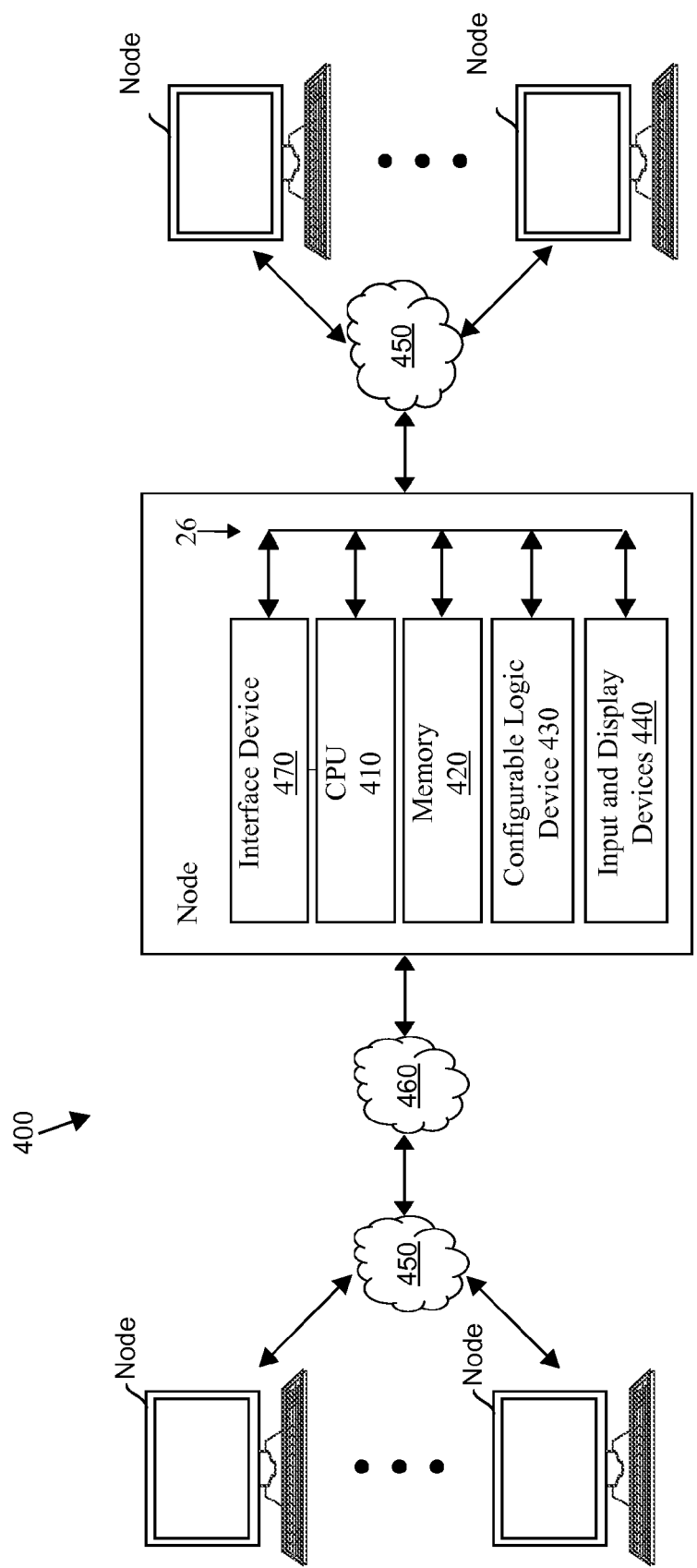

MANAGING VIDEO-ON-DEMAND IN A HIERARCHICAL NETWORK

FIELD

The present disclosure relates to a method and system for managing a Video on Demand (VoD) setup and more specifically to ranking the video files in the VoD setup.

BACKGROUND

With the widespread acceptance of Internet video, Video on Demand (VoD) systems have gained immense popularity. VoD provides subscribers choice while viewing content. The traditional means of transmission of video content are broadcast based systems, where the choice of the content is largely determined by content service providers, content telecast time, and audience viewing patterns. With the vast volume of content, it often becomes a challenge for a subscriber to decide which content would suit their taste. Hence content curation (involving discovery, gathering and presenting the content) is a field with tremendous growth potential. Some of the widely applied content curation techniques are search engines, recommendation engines.

Though various search algorithms are available for content selection, the search results often do not yield the desired content that the subscriber is looking for. On many occasions, the subscribers might not be looking for specific content but might be interested in similar content. This is where recommendation engines score over the search engines, by expanding the horizon of the subscriber's choice.

Various recommendation engines are designed which make the task of choosing a content easier and more relevant. Largely, these recommendations are based on the following—
  User's viewing history
  User's search parameters
  From the content recorded, finding patterns of subscriber's choice.
  Social Analytics—Information (Individual/Group preferences, Activities) gathered through social graphs from social networking sites (FACEBOOK®, TWITTER®, GOOGLE+®)
  Analyzing data from various content review based sites (ROTTEN TOMATOES®, IMDB®)
  Promotional content (like offer campaigns, discount offers, content trailers, movie special)

The most widely adopted infrastructure for content streaming is the hierarchical caching system (follows Distributed Architecture). When a subscriber selects content to view, the request is first looked up in the cache node (closest to the user node), if the content is readily available; it is streamed to the subscriber.

However, when the content is not available via the closest cached node, it forwards the request to its parent node to service the request (or to a node higher up in the hierarchy, if the request is not serviced by the parent node). The content is then streamed from the parent node to the subscriber, through the edge node and the leaf node, caching this content for future usage. In case of a server node transmitting the video, turnaround time of the transmission is higher, and also more network bandwidth is used.

The present disclosure provides an enhanced recommendation system for VoD which uses lesser network bandwidth.

SUMMARY

The present disclosure provides a method for managing a video-on-demand (VoD) for a set of video files stored in a hierarchical network comprising a plurality of nodes, one or more of the plurality of nodes being user nodes, each of the user nodes connected to one or more of the plurality of nodes, and one or more of the plurality of nodes storing a video file previously requested by a user node, the method comprising periodically ranking a video file for each user node based on, separation between a node in the network storing the video file and the user node, and interest of the user node for the video file; and on receiving a request for the VoD by the user node, performing the following: providing a list of the set of video files along with, recommending one or more video files from the set of video files having a predefined ranking.

The present disclosure further provides a system for managing a video-on-demand (VoD) for a set of video files stored in a hierarchical network comprising a plurality of nodes, one or more of the plurality of nodes being user nodes, each of the user nodes connected to one or more of the plurality of nodes, the system comprising a computer processor; a platform configured to provide the processor with the ability to periodically ranking a video file for each user node, from the set of video files wherein the ranking is based on a separation between a node in the network storing the video file and the user node, and interest of the user node for the video file; and on receiving a request for the VoD by the user node, performing the following providing a list of the set of video files along with, recommending one or more video files from the set of video files having a predefined ranking.

The present disclosure also provides a computer program product comprising a non-transitory computer-readable medium having a computer-readable program product embodied therein for managing a video-on-demand (VoD) for a set of video files stored in a hierarchical network comprising a plurality of nodes, one or more of the plurality of nodes being user nodes, each of the user nodes connected to one or more of the plurality of nodes, the computer readable program product comprising program instruction means for periodically ranking a video file for each user node based on a separation between a node in the network storing the video file and the user node, and interest of the user node for the video file; and on receiving a request for the VoD by the user node, providing a list of the set of video files along with recommending one or more video files from the set of video files having a predefined ranking.

BRIEF DESCRIPTION OF DRAWINGS

FIG. 4 shows the structure of a network and nodes of the present system.

DETAILED DESCRIPTION

The present disclosure provides a method and system for a VoD in a hierarchical network. The network has a server node and a plurality of nodes connected to the server node. The user nodes correspond to the end users who request a VoD. Each user node is connected to one or more nodes in the hierarchical network. These nodes have a cache memory. These nodes are also connected to other nodes higher in the hierarchy, eventually connected to the server node. The server node can be a plurality of computers connected in a predetermined topology. The server node(s) has a repository of all the video files to be provided for VoD. The server and other nodes are computing machines which contain cache memory. The server and other nodes are connected through LAN or WAN or any other known technologies as per the requirement.

The above system has been explained in greater detail in later part of the description.

Any video file requested by a user node is transmitted to a parent node of the user node, and is stored in the cache memory of the parent node. The cache memory may later be overwritten by another video file requested by another or the same user node. The previously stored video file may move to yet another parent node or parent of parent node.

Hence some video files are available in parent nodes rather than at the server node. The turnaround time of providing a video file to a user node accordingly depends on the separation between the user node and the parent node carrying the file.

The present disclosure relates to recommending the video files to user nodes based on the turnaround time. Accordingly when a user node wants to request a VoD, it will be presented with a complete list of the video files, plus also recommendations based on turnaround time. While recommending files, the disclosure also includes recommendation as per the interest of the user decided from his previously chosen video files for VoD.

Figure 1:
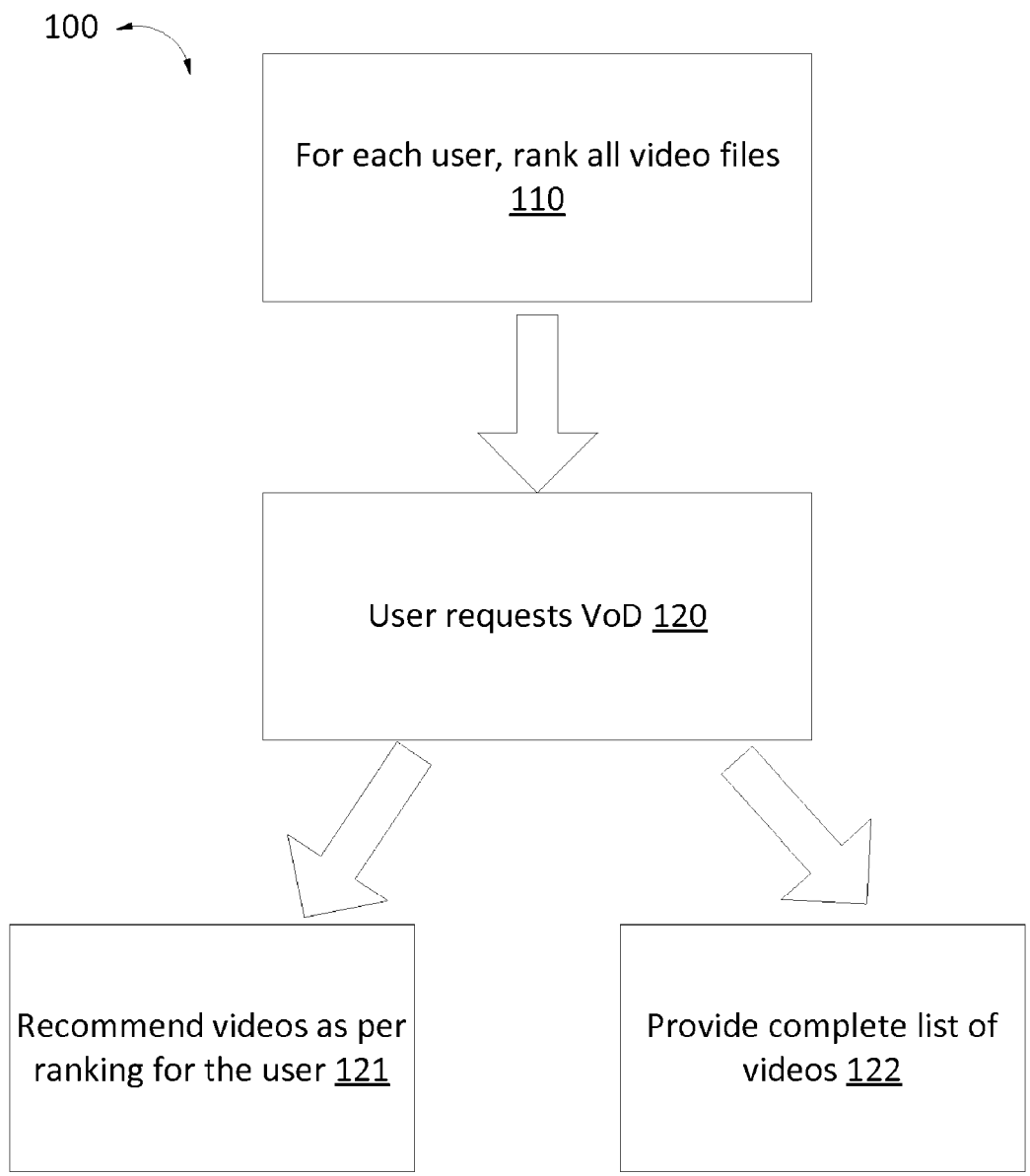
FIG. 1 relates to a flowchart showing the basic steps of the present disclosure.

FIG. 1 is a flowchart defining a preferred embodiment of the process of the present disclosure. In a preferred embodiment, each of the video file in the VoD system is ranked separately for each user node (110). This ranking is based on the turnaround time of transmitting the video file to the user node from the parent node in the network where the file is stored. The ranking also depends on the interest of the user for e.g., if it belongs to one of the category of videos previously watched by the user node. On receiving a request for a VoD by a user node, a video file is transmitted to a cache of a parent node of the user node. Subsequently when another user node connected to this parent node requests another video files, the another video file is also stored at the cache memory of the parent node. Depending on the cache size, previous video file may be moved farther away to another parent node. Thus a parent node of a user node has stored in its cache most recently watched movies by the user node.

The video files stored in the cache of a parent node of a user node are recommended to the user node whenever the user node initiates a VoD. Such videos have a lesser turnaround time and use lesser network bandwidth. In one embodiment, along with the turnaround time, the user interest is also considered. Along with the recommended videos, the user is also provided a list of all the video files (122). The recommended video files are an option for the user, which ensures smoother and faster transmission.

Figure 2:
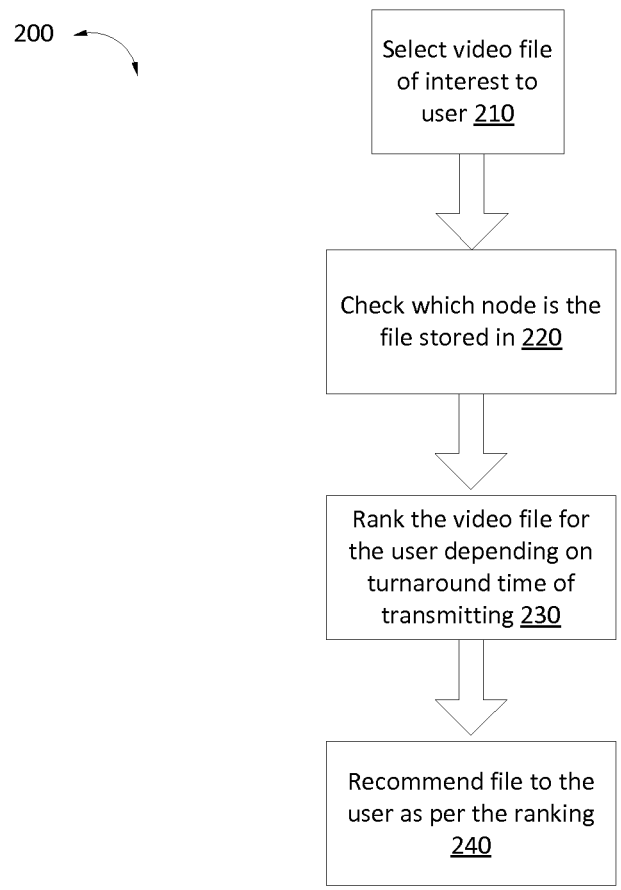
FIG. 2 is a flowchart explaining the process of the present disclosure in detail.

FIG. 2 is a flowchart describing the detailed working of a preferred embodiment of the present disclosure.

In a preferred embodiment, the following equation is used to rank all video files in a VoD setup for each user:

$$w = c + Ye/(d^n + p)$$

where w—calculated rank of the video file for the recommendation c—a constant weighted value Ye—a constant weighted value, which may depend on the availability of the video in a node (eg: 0 if missing, 1 if available)

d—estimated distance of the node from the user node (1 for direct connection, 2 for parent node, 3 for parent's parent etc.)

n—a factor for controlling weightage (typically 1)

p—an offset factor for controlling weightage (could be based on age of the content, other popularity factors etc.)

In one embodiment the offset factor can be defined by the interest of the user. In another embodiment the offset factor can be the present popularity of the content. The offset factor can be determined by any conventionally known methods (210).

For each user, the separation (or distance d) of the video files having a predefined offset factor, from the user node is determined (220). The files at a greater separation will have a higher turnaround time for transmission to the user node.

Based on the offset factor (p) and distance (d) the user nodes get a ranking using the above equation (230).

When a user node requests a VoD, a list of video files sorted as per the ranking is provided to the user node (240).

In a preferred embodiment the above ranking process is done periodically because the storage of video files will keep changing as user nodes keep requesting VoD. The time interval of the ranking is configurable by the VoD service providers.

In an embodiment, a video file stored at a parent node of a user node will get a higher ranking for that user node because the turnaround time for transmitting this video file to the user node will be the least.

Similarly a video file at a farther parent node (parent of parent) from the user node will get a lower ranking for that user node because the turnaround time for transmitting the video file to the user node will be more.

In a further embodiment, when there is a network failure and a part of the hierarchical network is disconnected, only the video files which are available in a cache memory which is not disconnected from the user node are recommended to the user node. This avoids a total failure of availability of videos during network failure. The complete list of video files is not provided in this case.

In one embodiment, where the offset factor is a user interest, such factor can be determined by analyzing what types of videos have been previously watched by the user. Such algorithms are conventionally known and can be easily used for the working of the present disclosure.

In yet another embodiment, the server node pushes some predetermined video files towards the user nodes so that they can be ranked higher. In an embodiment, this serves promotion of the specific videos. The video files for such promotion can be identified based on request by video owners in one embodiment.

Figure 3:
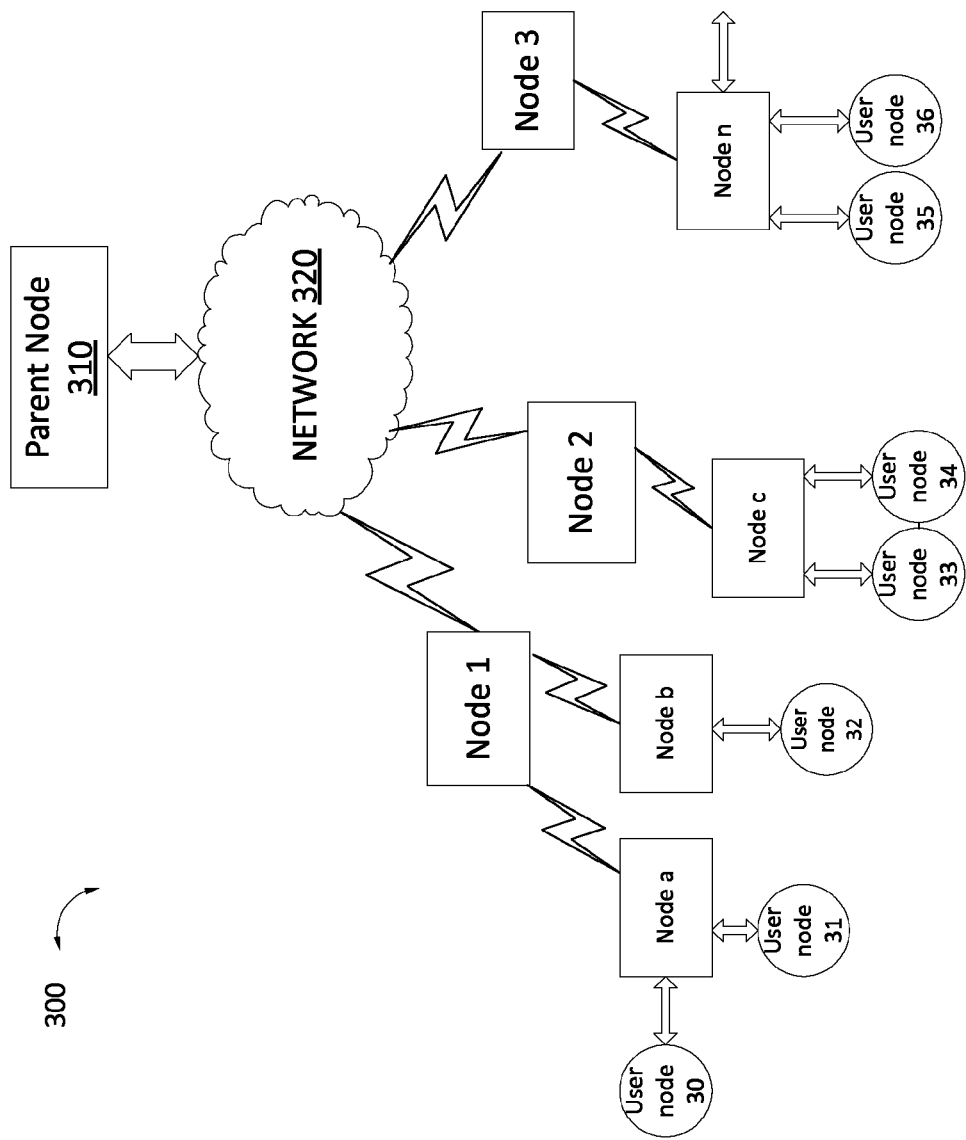
FIG. 3 is a block diagram explaining the system for the present disclosure.

FIG. 3 shows a block diagram for a preferred embodiment of the system of the present disclosure. The system relates to a hierarchical network (300). The network contains a server node (310) which is a default repository for all the video files of the VoD system. In one embodiment the server node can be an array of server systems. The server node is connected to multiple nodes, which in turn are connected to another level of nodes, Node 1, Node 2, Node 3. The hierarchy has multiple user nodes 30 . . . 36 which have parent nodes, Node a . . . Node n. One parent node can have more than one user nodes. The user nodes are end users which request the VoD.

FIG. 4 describes the above system with a detail about the structure of the network and the nodes. The nodes, including server nodes, parent nodes and user nodes, are coupled together by the Local Area Network (LAN) 460 and Wide Area Network (WAN) 450, although the environment can include other types and numbers of devices, components, elements and communication networks in other topologies and deployments. While not shown, the exemplary environment may include additional components, such as routers, switches and other devices which are well known to those of ordinary skill in the art and thus will not be described here.

The user node interacts with the parent and server nodes through the LAN 460 and WAN 450 although the interaction can be using any other network topologies. Additionally, the network can be hosted on a cloud or could be provided as a service.

The nodes includes at least one processor 410, memory 420, optional configurable logic 430, input and display devices 440, and interface device 470 which are coupled together by bus, although the nodes may comprise other types and numbers of elements in other configurations.

Processor(s) 410 may execute one or more computer-executable instructions stored in the memory 420 for the methods illustrated and described with reference to the examples herein, although the processor(s) 410 can execute other types and numbers of instructions and perform other types and numbers of operations. The processor(s) 410 may comprise one or more central processing units ("CPUs") or general purpose processors with one or more processing cores, such as AMD® processor(s), although other types of processor(s) could be used (e.g., Intel®).

Memory 420 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 420 may store one or more non-transitory computer-readable instructions of this technology as illustrated and described with reference to the examples herein that may be executed by the one or more processor(s). The flow chart shown in FIGS. 1 and 2 is representative of example steps or actions of this technology that may be embodied or expressed as one or more non-transitory computer or machine readable instructions stored in memory that may be executed by the processor(s) 410.

Input and display devices 440 enable a user, such as an administrator, to interact with the nodes such as to input and/or view data and/or to configure, program and/or operate it by way of example only. Input devices may include a touch screen, keyboard and/or a computer mouse and display devices may include a computer monitor, although other types and numbers of input devices and display devices could be used. Additionally, the input and display devices can be used by the user, such as an administrator to develop applications using Application interface.

The interface device in the nodes is used to operatively couple and communicate between the nodes which are all coupled together by LAN and WAN. By way of example only TCP/IP can be over Ethernet and industry-standard protocols.

Although an exemplary environment with the multiple user nodes and the parent and server nodes are described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

We claim:

1. A method for managing a video-on-demand (VoD) for a set of video files stored in a hierarchical network of nodes, the method comprising:
   periodically ranking a video file from the set of video files, wherein the ranking is based at least on—
      a separation distance between a node in the network storing the video file and a user node; and
   on receiving a request for the VoD by the user node, performing the following:
      providing a list of the set of video files; and
      recommending one or more video files from the set of video files having a predefined ranking.

2. The method as claimed in claim 1, wherein the ranking comprises, for the user node, giving a higher ranking to a video file available in a directly connected node to the user node.

3. The method as claimed in claim 1, wherein the ranking comprises, for the user node, giving a lower ranking to a video file not available in a directly connected node to the user node.

4. The method as claimed in claim 1, further comprising providing a list of video files available in a directly connected node to the user node, in the event of a network failure.

5. The method as claimed in claim 1, wherein the ranking further comprises an interest of the user node for the video file, wherein the interest is determined by analyzing video files previously requested by the user node.

6. The method as claimed in claim 1, further comprising transferring a video file by a server node in the hierarchical network, to a node closer to the user node to increase the ranking of the video file.

7. A system for managing a video-on-demand (VoD) for a set of video files stored in a hierarchical network, the system comprising:
   a computer processor;
   a platform configured to provide the processor with the ability to:
      periodically rank a video file from the set of video files, wherein the rank is based at least on—
         a separation between a node in the hierarchical network storing the video file and a user node; and
      on receiving a request for the VoD by the user node, perform the following:
         provide a list of the set of video files; and
         recommend one or more video files from the set of video files having a predefined ranking.

8. The system as claimed in claim 7, wherein the rank comprises a higher ranking for a video file available in a parent node of the user node.

9. The system as claimed in claim 7, wherein the rank comprises a lower ranking for a video file not available in a parent node of the user node.

10. The system as claimed in claim 9, further configured to provide a list of video files available in a parent node to the user node, in the event of a network failure.

11. The system as claimed in claim 7, wherein the rank is further based on an interest of the user node for the video file, wherein the interest is determined by analyzing video files previously requested by the user node.

12. The system as claimed in claim 7, further configured to transfer a video file by a server node in the hierarchical network, to a predefined node closer to the user node to increase the ranking of the video file.

13. A computer program product comprising a non-transitory computer-readable medium having a computer-readable program product embodied therein for managing a video-on-demand (VoD) for a set of video files stored in a hierarchical network, the computer readable program product comprising computer-executable program instructions for:
periodically ranking a video file from the set of video files, wherein the ranking is based on—
a separation distance between a node in the network storing the video file and a user nodes; and
interest of the user node for the video file; and
on receiving a request for the VoD by the user node, performing the following:
providing a list of the set of video files; and
recommending one or more video files from the set of video files having a predefined ranking.

14. The computer program product as claimed in claim 13, wherein the ranking comprises, for the user node, giving a higher ranking to a video file available in a parent node of the user node.

15. The computer program product as claimed in claim 13, wherein the ranking comprises, for the user node, giving a lower ranking to a video file not available in a parent node of the user node.

16. The computer program product as claimed in claim 15, further comprising computer-executable program instructions for providing a list of video files available in a parent node to the user node, in the event of a network failure.

17. The computer program product as claimed in claim 13, wherein the interest of the user node is determined by analyzing video files previously requested by the user node.

18. The computer program product as claimed in claim 13, further comprising computer-executable program instructions for transferring a video file by a server node in the hierarchical network, to a node closer in distance to the user node to increase the ranking of the video file.

19. A method for managing a video-on-demand (VoD) for a set of video files stored in a hierarchical network comprising a plurality of nodes, one or more of the plurality of nodes being user nodes, each of the user nodes connected to one or more of the plurality of nodes, and one or more of the plurality of nodes storing a video file previously requested by a user node, the method comprising:
for a user node, periodically ranking a video file from the set of video files, wherein the ranking is based on—
a separation between a node in the network storing the video file and the user node, and
interest of the user node for the video file;
on receiving a request for the VoD by the user node, performing the following:
providing a list of the set of video files; and
recommending one or more video files from the set of video files having a predefined ranking; and
receiving, in the user node, a list of video files available in a directly connected node, in the event of a network failure.

20. The method as claimed in claim 19, wherein the ranking comprises, for the user node, giving a higher ranking to a video file available in the directly connected node to the user node.

21. The method as claimed in claim 19, wherein the ranking comprises, for the user node, giving a lower ranking to a video file not available in the directly connected node to the user node.

22. The method as claimed in claim 19, wherein the interest of the user node is determined by analyzing video files previously requested by the user node.

23. The method as claimed in claim 19, further comprising transferring a video file by a server node in the hierarchical network, to a predefined node in the hierarchical network for predefined reason.

24. A system for managing a video-on-demand (VoD) for a set of video files stored in a hierarchical network comprising a plurality of nodes, one or more of the plurality of nodes being user nodes, each of the user nodes connected to one or more of the plurality of nodes, the system comprising:
a computer processor;
a platform configured to provide the processor with the ability to:
for a user node, periodically rank a video file from the set of video files, wherein the rank is based on—
a separation between a node in the network storing the video file and the user node, and
interest of the user node for the video file;
on receiving a request for the VoD by the user node, to perform the following:
provide a list of the set of video files; and
recommend one or more video files from the set of video files having a predefined ranking; and
receive at the user node a list of video files available in a parent node, in the event of a network failure.

25. The system as claimed in claim 24, wherein the rank comprises, for the user node, giving a higher ranking to a video file available in a parent node of the user node.

26. The system as claimed in claim 24, wherein the rank comprises, for the user node, giving a lower ranking to a video file not available in a parent node of the user node.

27. The system as claimed in claim 24, wherein the interest of the user node is determined by analyzing video files previously requested by the user node.

28. The system as claimed in claim 24, further configured to transfer a video file by a server node in the hierarchical network, to a predefined node in the hierarchical network for predefined reason.

* * * * *